US006925031B2

(12) United States Patent
Kriegshauser et al.

(10) Patent No.: US 6,925,031 B2
(45) Date of Patent: Aug. 2, 2005

(54) METHOD OF USING ELECTRICAL AND ACOUSTIC ANISOTROPY MEASUREMENTS FOR FRACTURE IDENTIFICATION

(75) Inventors: Berthold Kriegshauser, Rio de Janeiro (BR); Otto N. Fanini, Houston, TX (US); Richard A. Mollison, Tomball, TX (US); Liming Yu, Stafford, TX (US); Tsili Wang, Katy, TX (US); Xiao Ming Tang, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 288 days.

(21) Appl. No.: 10/317,457

(22) Filed: Dec. 12, 2002

(65) Prior Publication Data

US 2004/0001388 A1 Jan. 1, 2004

Related U.S. Application Data

(60) Provisional application No. 60/341,595, filed on Dec. 13, 2001.

(51) Int. Cl.[7] .............................. G01V 1/00; G01V 3/18
(52) U.S. Cl. ............................. 367/25; 367/73; 324/333
(58) Field of Search .............................. 367/25, 35, 73, 367/86; 181/102, 105; 324/333

(56) References Cited

U.S. PATENT DOCUMENTS

| | | | | |
|---|---|---|---|---|
| 4,832,148 A | | 5/1989 | Becker et al. ............... 181/104 |
| 4,924,187 A | | 5/1990 | Sprunt et al. ............... 324/376 |
| 5,402,392 A | * | 3/1995 | Lu et al. ....................... 367/75 |
| 5,502,686 A | * | 3/1996 | Dory et al. ................... 367/34 |
| 5,870,690 A | * | 2/1999 | Frenkel et al. ................ 702/7 |
| 5,900,733 A | * | 5/1999 | Wu et al. .................... 324/338 |
| 6,044,325 A | * | 3/2000 | Chakravarthy et al. ........ 702/7 |
| 6,098,021 A | * | 8/2000 | Tang et al. .................... 702/14 |
| 6,147,496 A | | 11/2000 | Strack et al. ................ 324/343 |
| 6,191,586 B1 | | 2/2001 | Bittar ........................... 324/339 |
| 6,502,036 B2 | * | 12/2002 | Zhang et al. .................. 702/7 |
| 6,541,975 B2 | * | 4/2003 | Strack ......................... 324/323 |
| 6,614,716 B2 | * | 9/2003 | Plona et al. .................. 367/31 |

OTHER PUBLICATIONS

Johnston, et al. "Applications of Azimuthal Anisotropy from Dipole Shear Sonic in Western Venezuela." Mar. 5, 1997. abstract.*
Bose, S. "Performance Bounds on Shear Anisotropy Azimuth Estimation Using Borehole Sonic Logging Tools." 2002, IEEE.*
Yang, Wei. "Modeling and Inversion of Azimuthal Lateral Resistivity Logging." Petroleum University of China. Department of Earth Sciences.*
Michael Schoenberg et al.; *Seismic anisotropy of fractured rock*, Geophysics, vol. 60, No. 1 (Jan.–Feb. 1995), pp. 204–211, 2 Figs., 1 Table.

* cited by examiner

*Primary Examiner*—Bernarr E. Gregory
*Assistant Examiner*—Scott A Hughes
(74) *Attorney, Agent, or Firm*—Madan, Mossman & Sriram, P.C.

(57) ABSTRACT

Measurements made by a cross-dipole acoustic logging tool in a borehole are processed to determine the principal directions of azimuthal anisotropy of a subsurface formation. Measurements indicative of azimuthal resistivity variations are also made with a multicomponent induction logging tool. These electrical measurements are processed using the principal direction determined from acoustic measurements to give an estimate of azimuthal resistivity variations. Based on modeling results, azimuthal resistivity variations are interpreted to estimate a fracture depth in the rock for known fluids therein.

14 Claims, 13 Drawing Sheets

METHOD OF USING ELECTRICAL AND ACOUSTIC ANISOTROPY MEASUREMENTS FOR FRACTURE IDENTIFICATION

CROSS REFERENCES TO RELATED APPLICATIONS

This application claims priority from U.S. Provisional Patent Application Ser. No. 60/341,595 filed on Dec. 13, 2001.

BACKGROUND OF THE INVENTION

1. Field of the Invention

The invention is related generally to the field of interpretation of measurements made by well logging instruments for the purpose of determining the properties of earth formations. More specifically, the invention is related to a method for identification of the extent and direction of fracturing in subsurface formations.

2. Background of the Art

A significant number of hydrocarbon reservoirs comprise fractured rocks wherein the fracture porosity makes up a large portion of the fluid-filled space. In addition, the fractures also contribute significantly to the permeability of the reservoir. Identification of the direction and extent of fracturing is important in reservoir development for two main reasons.

An important reason for identification of fracture direction is that such a knowledge makes it possible to drill deviated or horizontal boreholes with an axis that is preferably normal to the plane of the fractures. In a rock that otherwise has low permeability and porosity, a well drilled in the preferred direction will intersect a large number of fractures and thus have a higher flow rate than a well that is drilled parallel to the fractures. Knowledge of the extent of fracturing also helps in making estimates of the potential recovery rates in a reservoir and in optimizing the production from the reservoir.

Fractures in the subsurface are to a large extent produced by stress fields. Specifically, fracture planes are oriented in a direction orthogonal to a direction of minimum principal stress in the subsurface. The stress field in a fractured formation is anisotropic. A commonly observed effect of an anisotropic stress field or of fracturing is the phenomenon of shear wave birefringence wherein the velocity of shear waves is dependent upon the direction of propagation and the polarization of the shear wave.

The phenomenon shear wave birefringence in subsurface formations was reported by Alford on surface seismic data. Seismic data has a resolution of the order of tens of meters and it is difficult to correlate surface seismic measurements of azimuthal anisotropy with specific reservoir intervals. Subsequent to the work of Alford, there have been other teachings, such as of Winterstein on the use of a "stripping" technique for relating surface measurements of azimuthal anisotropy to subsurface formations. The stripping techniques have a large amount of uncertainty associated with the estimate of the principal directions of shear wave anisotropy.

Becker (U.S. Pat. No. 4,832,148), the contents of which are fully incorporated herein by reference, teaches the use of an acoustic borehole logging method in which traveltimes of shear waves with two different polarizations are measured. By using a coordinate rotation of the measured shear waves, the principal directions may be determined. The principal directions correspond to shear waves having polarization parallel to and perpendicular to the fracture strike, the former having a higher velocity than the latter. This strike direction is often the maximum in-situ stress direction. In U.S. Pat. No. 6,098,021 to Tang et al., the contents of which are fully incorporated herein by reference, radially polarized monopole shear waves are used to determine the extent of anisotropy proximate to the borehole. The birefringence of cross-dipole shear waves that have a lower frequency than the monopole waves are then used as an indication of shear wave anisotropy further away from the wellbore in the formation.

The method taught by Tang is thus an improvement over Becker insofar as it is possible to distinguish, in a qualitative manner, between near-borehole effects and effects further away from the borehole. A drawback of shear wave birefringence measurements is their inability to distinguish between anisotropy caused by stress and anisotropy caused by fracturing. Though the fracturing may be caused by stress anisotropy, being able to delineate fractures is important in well planning.

In addition to their effects on elastic wave propagation, electrical anisotropy is also present in the subsurface. It should be noted that in the present application, the terms "elastic" and "acoustic" are used interchangeably, although the latter term is not technically correct. In U.S. Pat. No. 4,924,187 to Sprunt et al, the contents of which are fully incorporated herein by reference, a core sample from a subterranean formation is shaped to provide a plurality of parallel, planar outer surfaces. Electrical resistivity is measured in each of the azimuthal directions through the core sample which are perpendicular to each of the pairs of parallel, planar outer surfaces for each of a plurality of differing fluid saturations within the core sample. A logarithmic plot is made of measured resistivity versus water saturation for each of the azimuthal directions through the core sample for which resistivity was measured. If the same logarithmic plot is obtained for all measured azimuthal directions, the core sample is identified as being electrically isotropic. If different logarithmic plots are obtained for at least 2 azimuthal directions the core sample is identified as being electrically anisotropic.

Figure 1:
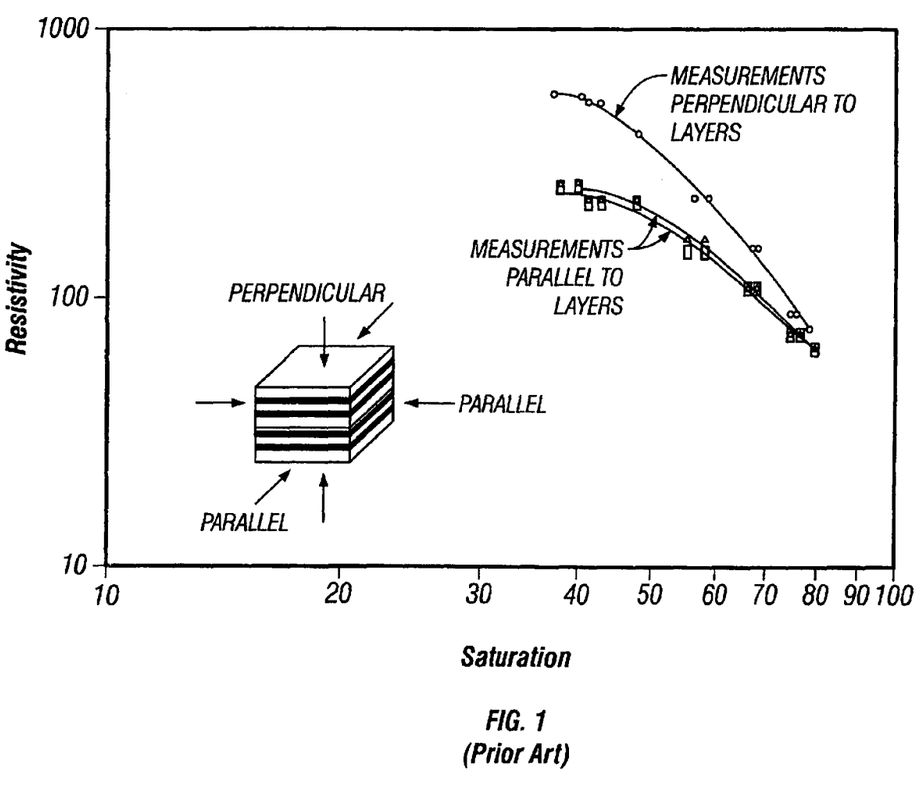

There are two conclusions that may be drawn from the results shown by Sprunt shown in FIG. 1. The first is that there is relatively little azimuthal variation in electrical anisotropy on a core sample compared to differences between measurements made parallel to and orthogonal to the bedding plane. The differences are particularly large at low water saturation. The azimuthal variations are of the order of a few percent whereas the resistivity perpendicular to the bedding plane may be five times the resistivity parallel to the bedding plane. The second conclusion is that the measured anisotropy is dependent upon the water saturation. The latter effect suggests that measurements of azimuthal variations in electrical anisotropy may be indicative of fracturing and/or hydrocarbon saturation.

U.S. Pat. No. 6,191,586 to Bittar teaches an apparatus and method for implementing azimuthal capabilities on electromagnetic wave resistivity well logging tools. The apparatus comprises a structurally simple antenna shield positioned around either the transmitting or receiving antennas, or both, positioned on the well logging tool on the drill string. The shields partially surround the tool and provide an electromagnetic barrier for either the transmission or reception of electromagnetic waves, as the case may be. Positioned on the shield are appropriately placed and sized windows through which electromagnetic waves may either be transmitted or received, depending upon the function of the antenna that the shield surrounds. One of the teachings of Bittar is the use of the device for estimating the dip of the formation (viz., inclination of the tool axis to the normal to the bedding plane). The effects of dip can be quite large given the differences noted in FIG. 1 between the vertical and horizontal resistivities. The tool of Bittar uses transmitter antennas with the coil axis parallel to the tool and the borehole and is not designed to detect the smaller effects due to any oriented fracturing in the formation.

Heavy muds may induce fractures when the mud pressure exceeds the rock strength. In hydrocarbon basins, the maximum stress is often in the vertical axis and the minimum stress is in the horizontal axis. For this reason the fracture will tend to be vertical and follow the direction towards maximum stress levels. From the theory of mechanics, it can be shown that the normal to the fracture direction is a direction of minimum principal stresses, so that the preferential fracture strike direction is aligned with the maximum in-situ stress. Previous investigations have suggested that, except in very shallow wells, most hydraulically created fractures will be vertical or nearly vertical. The fractures change the formation's mechanical and electrical properties and thus influence both acoustic and induction resistivity logs. It is important to be able to determine from the depth of fracturing whether they are induced by the drilling process or whether they are preexisting fractures. The latter are important from the standpoint of reservoir development whereas the former may only be indicative of the stress field in the proximity of the wellbore.

There is a need for a method of determination of the extent and direction of fracturing in subsurface earth formations. Such a method should preferably be fast in operation in the sense that it should be possible to acquire data at normal logging speeds. The present invention satisfies this need.

SUMMARY OF THE INVENTION

The present invention is a method for determination of subsurface fracturing directions and extent of fracturing. An acoustic logging tool is used in a borehole within the formation and making a set of acoustic measurements. The measurements from the cross-dipole tool are processed to obtain an estimate of a principal direction of azimuthal anisotropy of the subsurface formation relative to an axis of the borehole. An electrical logging tool in the borehole makes measurements of the azimuthal variation of electrical resistivity. Using a model including the principal direction of anisotropy determined from the cross-dipole measurements, the electrical measurements are rotated into the principal direction to give an indication of the electrical anisotropy in the principal direction.

In a preferred embodiment of the invention, the acoustic logging tool comprises two crossed-dipole shear transmitter and receiver systems generate two dipole shear waves with different polarization. The estimate of the principal direction of anisotropy further comprises determining a velocity or travel time difference between said two dipole shear waves and determining the orientation of the fast shear-wave polarization with respect to the tool frame.

Preferably, the electrical logging tool comprises a multicomponent induction logging tool (3DEX), including transmitter and receiver antennas oriented orthogonal to the tool axis. Various combinations of $H_{xx}$, $H_{yy}$ and $H_{xy}$ measurements are used in the method of the present invention.

The model includes various parameters, including resistivity of the unfractured rock, the fracture density, the fluid saturation in the fractures, and the resistivities of the fluids in the fractures. The resistivities of the rock and the fluids is obtained by other measurements or known a priori. Based on modeling calculations, the observed electrical anisotropy is interpreted to give the fracture depth.

BRIEF DESCRIPTION OF THE FIGURES

The application is best understood with reference to the following drawings wherein like numbers in different figures refer to like components FIG. 1 (PRIOR ART) shows the electrical anisotropy of a core sample.

DETAILED DESCRIPTION OF THE INVENTION

In the method of the present invention, a cross-dipole logging tool is used to determine the propagation velocities of shear waves generated by transmitters with two different (preferably orthogonal) polarizations and recorded by at least two receivers with preferably orthogonal orientation. By using prior art methods such as that described by Tang, the principal directions of azimuthal anisotropy for shear waves is determined along with the two shear velocities. As noted in the background of the invention, there is no guarantee that the borehole axis would be normal to the bedding plane. However, those versed in the art would recognize that for deviations from normality of up to 10°, the effects of dip would be small and the prior art rotation method would give reasonably good estimates of the principal directions of azimuthal anisotropy.

Figure 2:
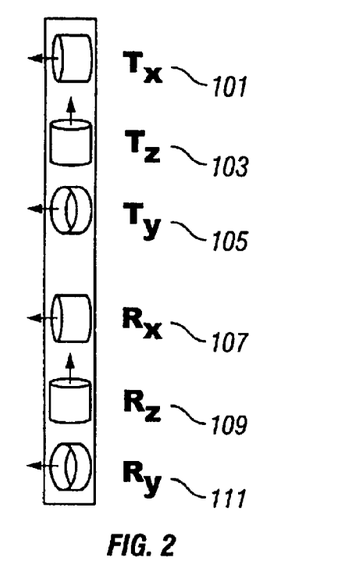
FIG. 2 shows the arrangement of transmitter and receiver coils in a preferred embodiment of the present invention marketed under the name 3DEX™.

Referring to FIG. 2, the configuration of transmitter and receiver coils in a preferred embodiment of the 3DEX induction logging instrument of Baker Hughes is shown. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_X$, $R_Y$, and $R_Z$ receivers, for measuring the corresponding magnetic fields. In a preferred mode of operation of the tool, the $H_{XX}$, $H_{YY}$, $H_{ZZ}$ $H_{XY}$, and $H_{XZ}$ components are measured, though other components may also be used, e.g., $H_{XX}$,$H_{ZZ}$ $H_{ZX}$, or $H_{ZY}$. The convention used in this application is to use upper case symbols for a tool based tool-based coordinate systems and lower case for earth based coordinate system. The differences are discussed later.

Figure 3:
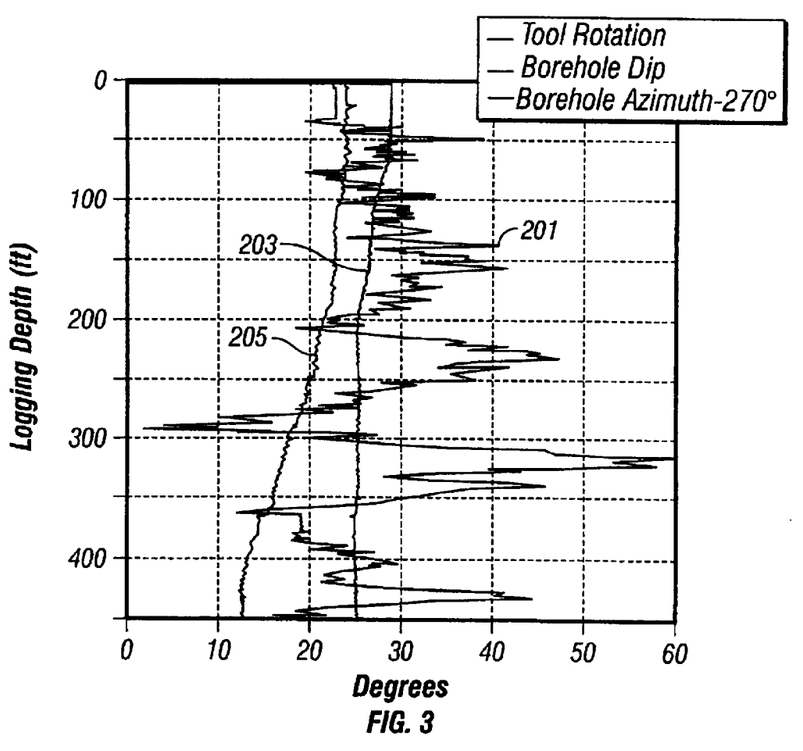
FIG. 3 shows a comparison between the anisotropy ratio for acoustic waves and the anisotropy ratio for resistivity measurements at 21 kHz.
Figure 4:
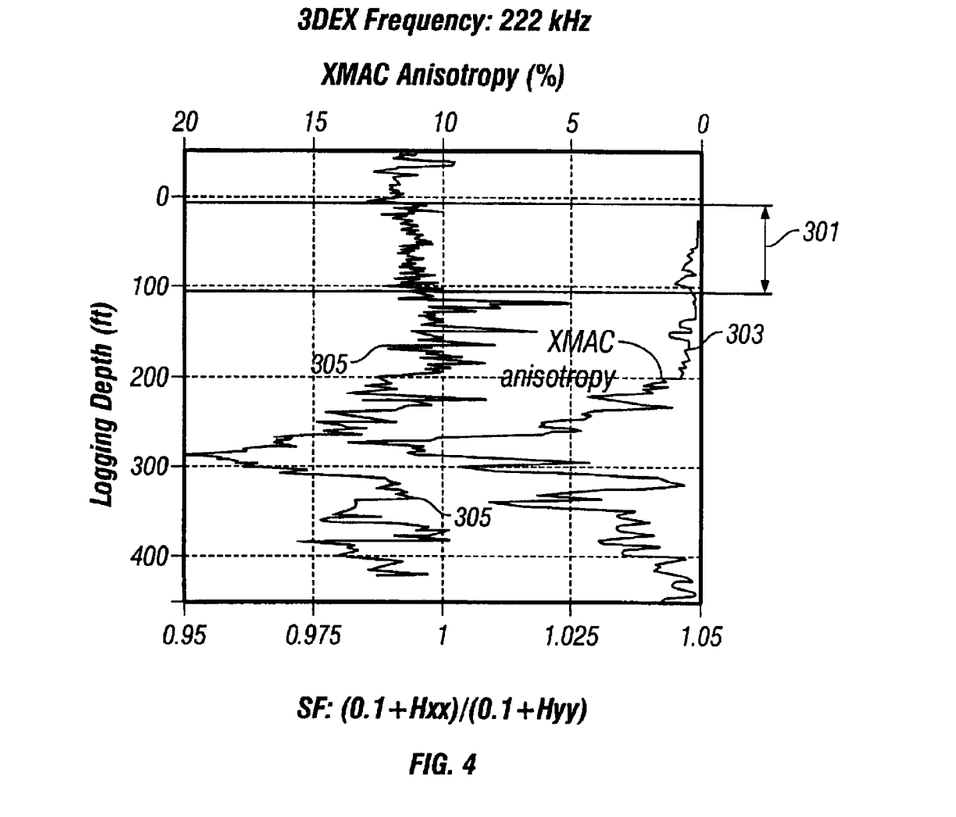
FIG. 4 shows a comparison between the anisotropy ratio for acoustic waves and the anisotropy ratio for resistivity measurements at 222 kHz.

The method of the present invention is best understood by way of example. FIG. 3 shows an example of data from a borehole. A total depth interval as measured along the borehole of approximately 450 ft (~140 m) is shown. The curve 201 shows the tool rotation angle, the curve 203 shows the borehole inclination to vertical and the curve 205 shows the borehole azimuth. These measurements were obtained using conventional sensing devices. Corresponding resistivity and acoustic parameters measured over the same interval are shown in FIG. 4. The curve 303 is the result of processing the cross-dipole acoustic data: shown is the determined anisotropy between the two shear modes propagating parallel to the borehole axis. The curve 305 is a normalized ratio of the $H_{XX}$ and $H_{YY}$ measurements made with the 3DEX logging tool at a logging frequency of 222 kHz. Not shown in FIGS. 3–4 are the gamma ray measurements obtained over the same interval. The gamma ray logs indicate that the interval shown is predominantly shaly with sands present between 150–200 ft and 220–250 ft (indicated as S1 and S2 in FIG. 4).

The depth interval indicated as 301 in FIG. 4 shows that the measured difference between the two shear wave modes is less than 1% in the interval 301 that is known from gamma ray measurements to be entirely shale. The borehole deviation from vertical over entire interval shown in FIG. 4 is between 25° and 30°. The small shear wave anisotropy in the interval 301 is an indication that there is no intrinsic transverse isotropy (TI) in the acoustic velocities of shales within the well (transverse isotropy being defined as the difference between wave velocities parallel to the bedding and perpendicular to bedding). If there were significant TI in the shales, a cross dipole tool would detect it when making measurements at a significant deviation from the normal to the bedding plane. However, inversion of the 3DEX data (not shown in the figure) indicates that the vertical resistivity in the shales is approximately three times the horizontal resistivity in the depth interval 301, i.e., there is significant transverse isotropy in the resistivity of the shales. The same inversion shows that within the intervals S1 and S2 identified as being predominantly sandy, the difference between vertical and horizontal resistivities is much smaller. A suitable method for inversion of multi-component induction logging data is disclosed in co-pending U.S. patent application Ser. No. 09/798,120 of Zhang et al, now U.S. Pat. No. 6,502,036, the contents of which are incorporated herein by reference.

One of the parameters of interest in hydrocarbon reservoir development is the identification of fractures. The fractures provide a conduit for hydrocarbon flow, so that permeability parallel to the fractures is much higher than permeability in a direction perpendicular to the fracture planes. One effect of aligned fractures is to produce an azimuthal anisotropy. Strictly speaking, aligned fractures in an isotropic medium also result in transverse isotropy, but for the purposes of this invention, we refer to it as azimuthal anisotropy and reserve the term TI for anisotropy caused by bedding. On a cross-dipole acoustic logging tool, this results in a difference in propagation velocities of axially propagating shear waves with polarizations parallel to and orthogonal to the fracture plane. Such an effect is seen in FIG. 4 in the deeper interval from 250 ft to 400 ft, where it can be seen that the curve 303 shows a significant difference between the two shear modes: the difference is as large as 10%. This interval is known to be shaly, and based upon the discussions made above, this large difference cannot be due to measurements being made in a TI medium in a deviated borehole. Thus, the cross-dipole measurements suggest that there are some intervals shown in FIG. 4 where there is significant azimuthal anisotropy, possibly due to fracturing. However, the cross-dipole logging tool has a logging frequency of 2 kHz. The shear velocity in the shales and the sands ranges between 180 $\mu$s/ft and 200 $\mu$s/ft (approximately 1600 m/s). Accordingly, the wavelength of the shear waves is approximately 1.2 m. This means that the cross-dipole tool does not see deep into the formation. It would therefore be desirable to have some other measurements that would be diagnostic of the depth of the fracturing. This may be done using the 3DEX measurements as discussed next.

Those versed in the art would recognize that inversion of 3DEX data acquired in deviated boreholes in the presence of azimuthal anisotropy is an almost intractable problem. The $H_{zz}$ component of the data in a vertical borehole, as is well known, is indicative primarily of the horizontal conductivity of earth formations and due to the axial symmetry, averages out any azimuthal variations in horizontal resistivity. The $H_{xx}$ and $H_{yy}$ components in a vertical borehole are responsive to a combination of the vertical resistivity and the horizontal resistivities in the y- and x-directions respectively. In theory, in a vertical borehole the principal components $H_{xx}$, $H_{yy}$ and $H_{zz}$ components may be inverted to give three resistivity values (the vertical resistivity and two horizontal resistivities) in an azimuthally anisotropic medium. However, in a deviated borehole, even in the absence of azimuthal anisotropy, the $H_{xx}$ and $H_{yy}$ will be different and sensitive to tool rotation. Additional information, such as borehole dip and azimuth are required to derive the formation resistivities, or additional magnetic field data, such as Hxy, Hxz, etc., have to be incorporated in the inverse process. In theory, the cross components should be able to improve the accuracy of an inversion, depending on the signal-to-noise ratio.

However, the present invention shows that a combination of 3DEX data and cross-dipole measurements may be used for interpretation of fractures in the subsurface. Returning now to FIG. 4, it can be seen that the curve 305 over the depth interval from 250 ft to 400 ft shows a significant difference between the $H_{XX}$ and $H_{YY}$ measurements and is strongly correlated with the anisotropy in the cross-dipole measurements. As noted above, the acoustic measurements are indicative of fracturing in the interval. While there is some tool rotation within this interval (see 202 in FIG. 3), the rotation generally lies within a range of 45°. The differences between the $H_{XX}$ and $H_{YY}$ measurements are indicative of the depth extent (radial extent) of fractures into the formation, as is shown next.

Figure 5A:
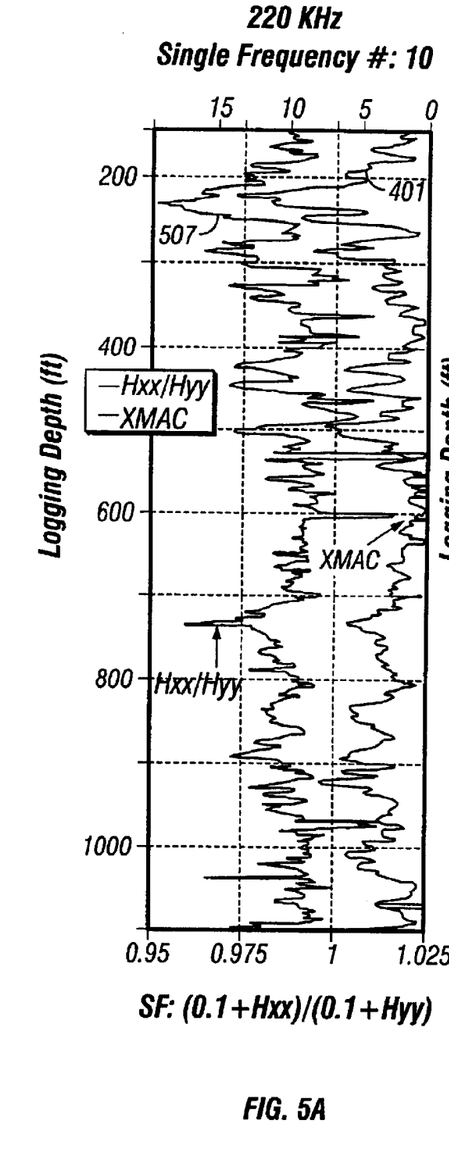
FIG. 5 shows multicomponent induction measurements at 220 kHz (right panel) and a comparison of electrical and shear wave anisotropy (left panel)
Figure 5B:
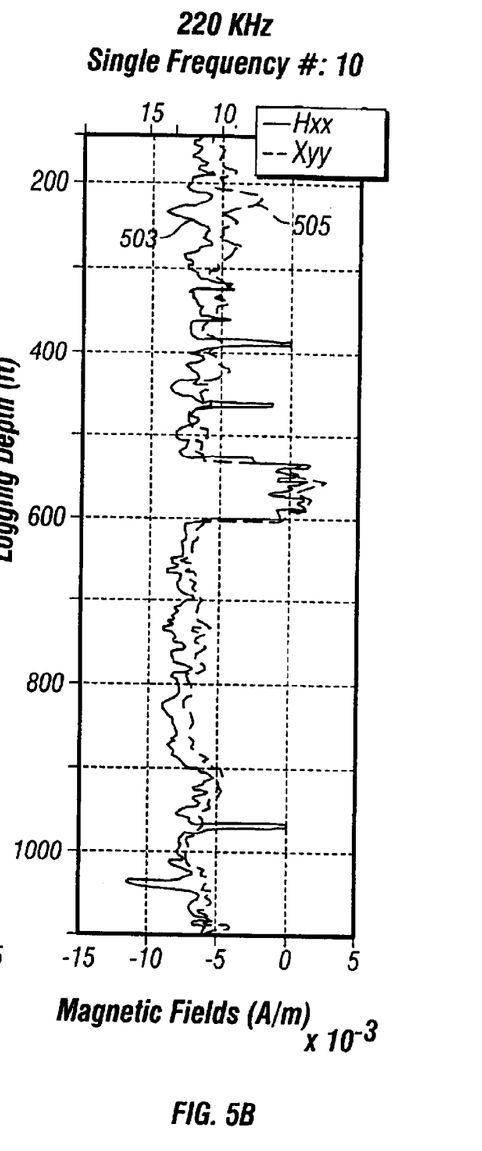
Figure 6A:
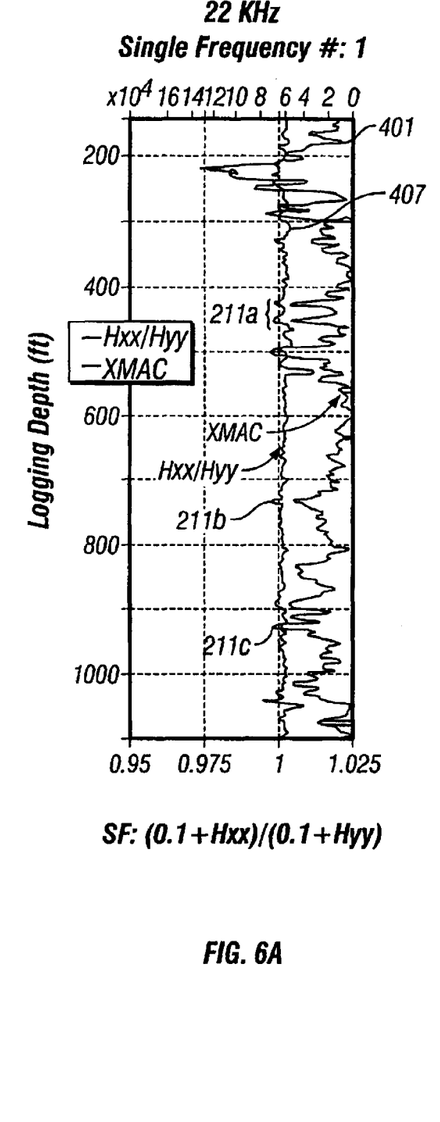
FIG. 6 is similar to FIG. 5 with the induction measurements being made at 22 kHz.
Figure 6B:
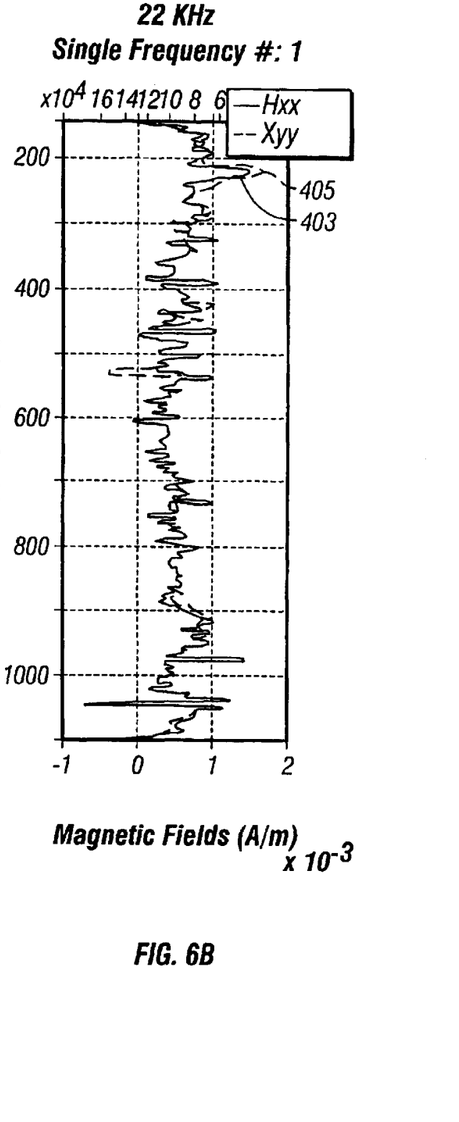

Turning now to FIG. 5, a larger depth interval is shown The curve 401 shows the anisotropy for shear waves along the axis of the borehole. Measurements were also made in the same well over the same depth interval with the 3DEX$^{SM}$ transverse induction logging tool of Baker Hughes at a frequency of 222 kHz. The normalized ratio of the curves 503 and 505 (the $H_{XX}$ and $H_{YY}$ measurements) is shown by the curve 507. FIG. 6 shows similar plots for a logging frequency of 21 kHz. 405 and 403 are the $H_{XX}$ and $H_{YY}$ measurements while 407 is their normalized ratio.

The differences in observed azimuthal electrical anisotropy between FIGS. 5 and 6 can provide information about the how much the fracture has propagated and developed into the formation. Specifically, in the intervals indicated by 211a, 211b, 211c, the electrical anisotropy (as seen in differences between $H_{XX}$ and $H_{YY}$ measurements) is less at the lower frequencies. Lower frequency measurements see further into the formation than higher frequency measurements. Therefore this data can be utilized jointly with cross-dipole acoustic measurements to better characterize fractures. This also should be applicable to galvanic lateral array instrument measurements which provides measurements with different depth of investigation. HDIL tools with different spacings and/or frequencies may also be used for the purpose.

Borehole image tool measurements can provide additional information for the characterization of fractures. The image data provides fracture information at smaller scale the other measurements discussed about such as the aperture of the fracture and some indications of the resistivity within the fracture. Analysis of the borehole image data can also provide the relative dip of the fracture intersecting the well or induced by drilling. U.S. Pat. No. 5,502,686 to Dory et al, and U.S. patent application Ser. No. 09/754,431 (now U.S. Pat. No. 6,348,796) to Evans et al, the contents of which are fully incorporated here by reference, disclose suitable devices for resistivity imaging. The methods for interpretation of resistivity images and acoustic images of borehole walls for determination of relative strike and dip directions of fractures would be known to those versed in the art.

Schoenberg and Sayers presents a modeling methodology for acoustic properties of a fractured media and concludes that seismic measurements may be useful for determining the orientation of the dominant set of fractures and some estimate of the fracture compliance relative to the compliance of the unfractured rock. They further conclude that estimation of the shape and size distribution of the fractures cannot be done from long wavelength seismic data. To a large extent, this is because the propagation velocities of acoustic waves in fluids and in rocks differ by at most a factor of 5 or so. In comparison, the resistivity contrast between fluids and rocks can differ by several orders of magnitude, so that the effects are more noticeable even at low fracture densities. This is used in the present invention to determine the fracture densities in a rock.

Use of the principles discussed above is next shown with a comprehensive example discussed with reference to FIGS. 7–13. Shown in track 601 are the gamma ray 621 and caliper log 623. Shown in track 603 are the density 631 and neutron porosity log 633. Track 605 shows the XX and YY apparent conductivity logs for a frequency of 21 kHz. Tracks 607 and 609 show XX and YY apparent conductivity logs for frequencies of 62 kHz and 222 kHz respectively. Finally, track 611 shows the ZZ apparent conductivity log for frequencies of 21 kHz, 62 kHz and 222 kHz. The tool configuration used for obtaining the conductivity logs has been discussed above with reference to FIG. 2.

Figure 7:
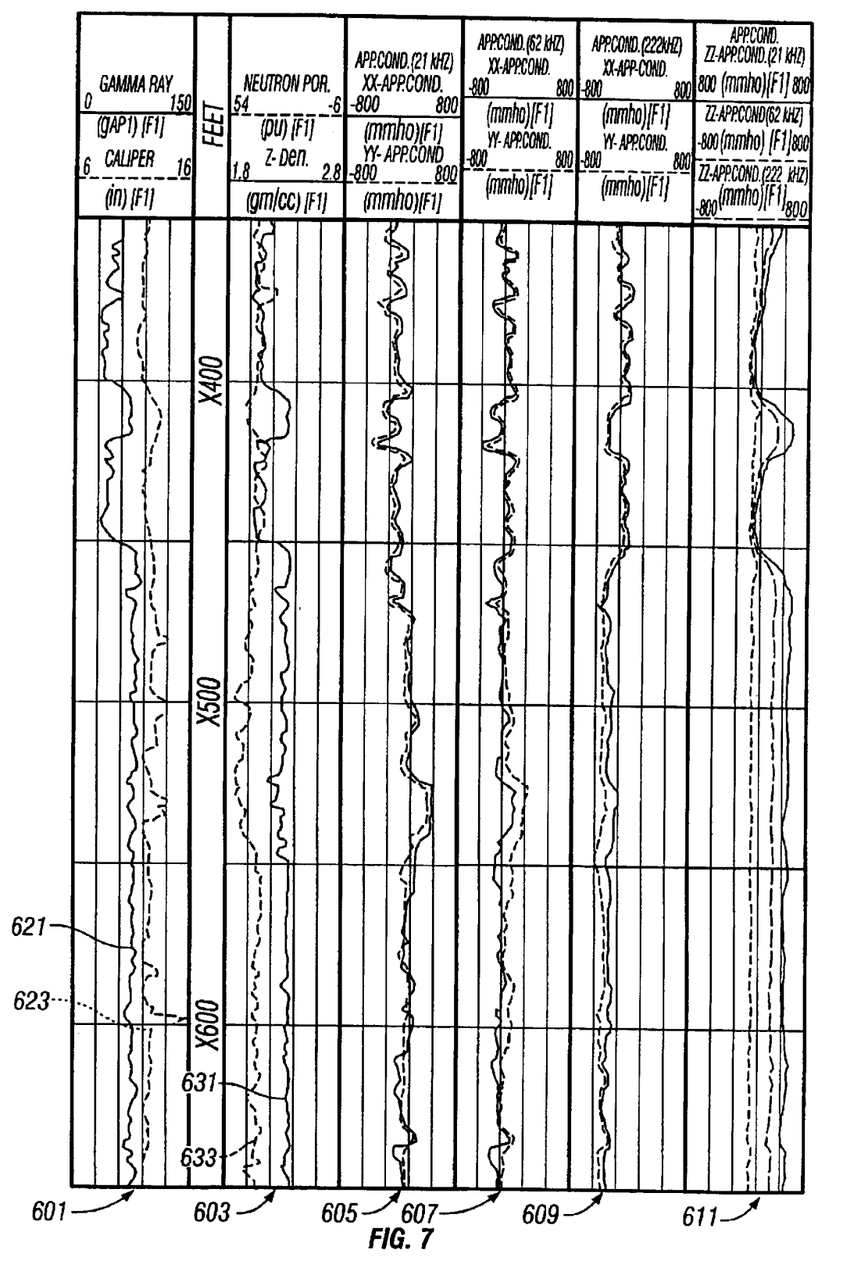
FIG. 7 shows examples of multicomponent induction measurements in an exemplary well at several frequencies over a depth interval having fractures

Still referring to FIG. 7, the upper part section (above X460 ft) of the interval contains sands and sand/shale lamination. The lower part section consists mainly of shales. Note that above X460 ft, the XX and YY logs are almost identical values. Below X470 ft, the two logs read differently over much of the interval. The maximum differences take place between X510 and X560 ft. In contrast, the ZZ log in that interval shows little variation. Meanwhile, around X530 ft the caliper reads about 2 in. larger. The density drops by about 0.18 gm/cc between X510–540 ft, and the neutron porosity increases from about 24 pu to about 44–48 pu around X525 ft.

Figure 8:
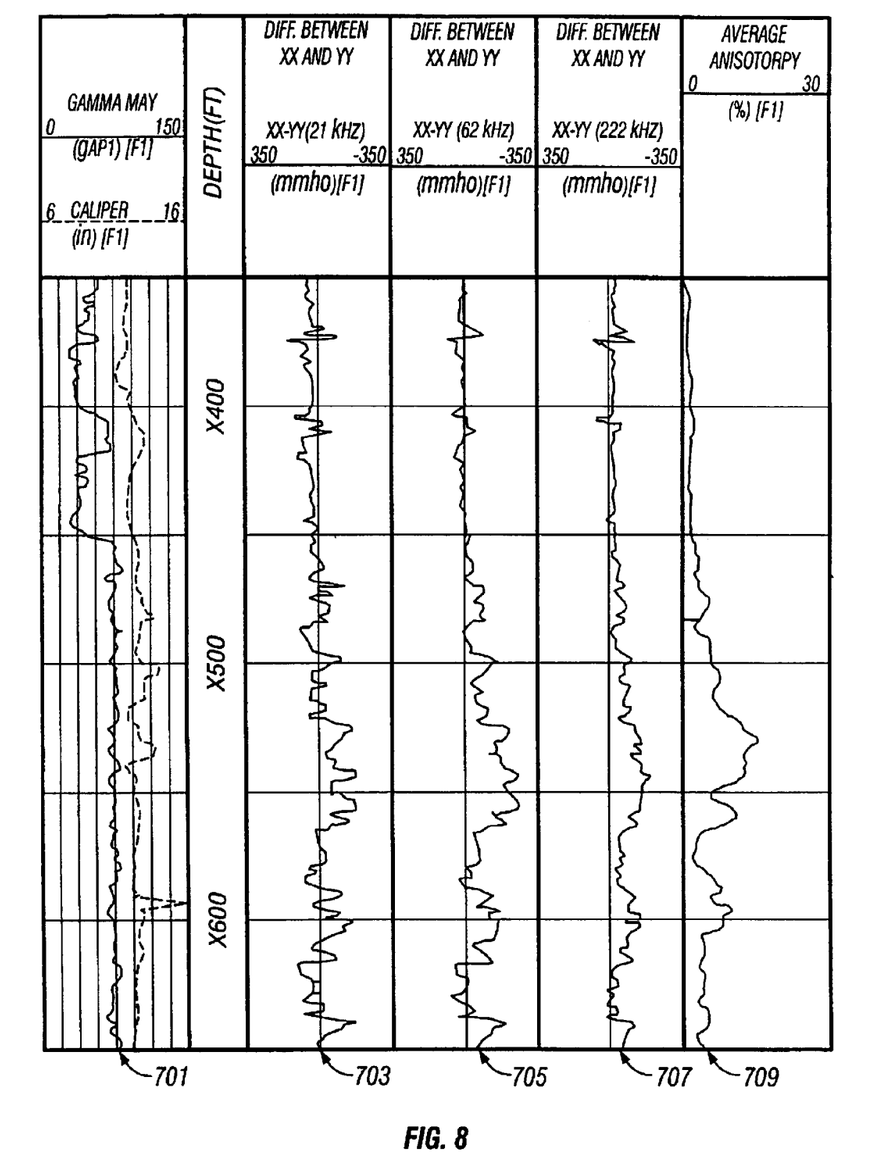
FIG. 8 shows the difference between XX and YY components of the data of FIG. 4
Figure 9:
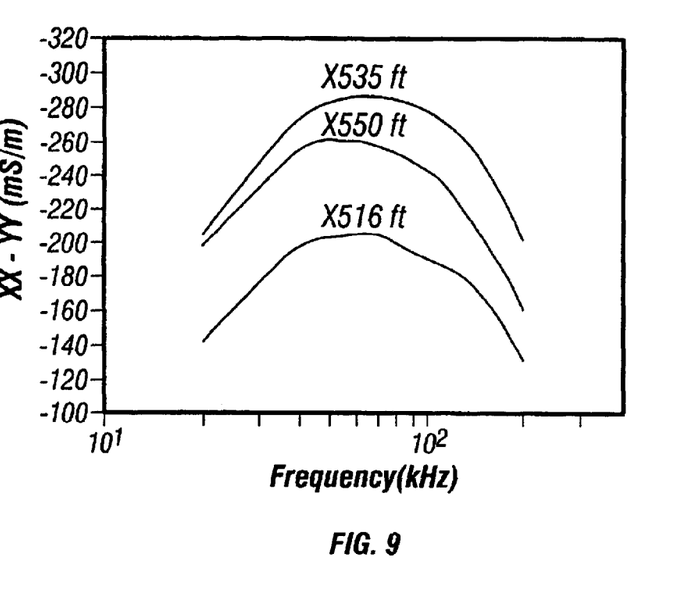
FIG. 9 shows the difference between XX and YY components as a function of frequency for three difference selected depths of the exemplary well.

To further examine the XX and YY logs in furthermore details, FIG. 8 includes a plot of the differences between these two. Shown in 701 are the gamma ray and caliper logs (same as in 601). Tracks 703, 705, and 707 show the difference between the XX and YY measurements for 21 kHz, 62 kHz and 222 kHz respectively. Also shown in 709 is the azimuthal shear-wave velocity anisotropy ratio derived from the cross-dipole log data, as will be discussed later. Notice the remarkable correspondence between the induction log difference and the shear velocity anisotropy ratio over the log interval. The difference between the XX and YY logs in the interval of X510–560 ft reaches about 250 mS/m in magnitude, depending on frequency. This difference value first increases as frequency increases from the low end of the measurement frequency spectrum and then drops as frequency further increases to the high end of the spectrum. This feature is clearly seen in FIG. 9 for three depths within the log interval. As discussed above, in the well for which the logs are shown, the most likely cause for the difference between the XX and YY induction logs are fractures, either naturally occurring or drilling induced.

Figure 10:
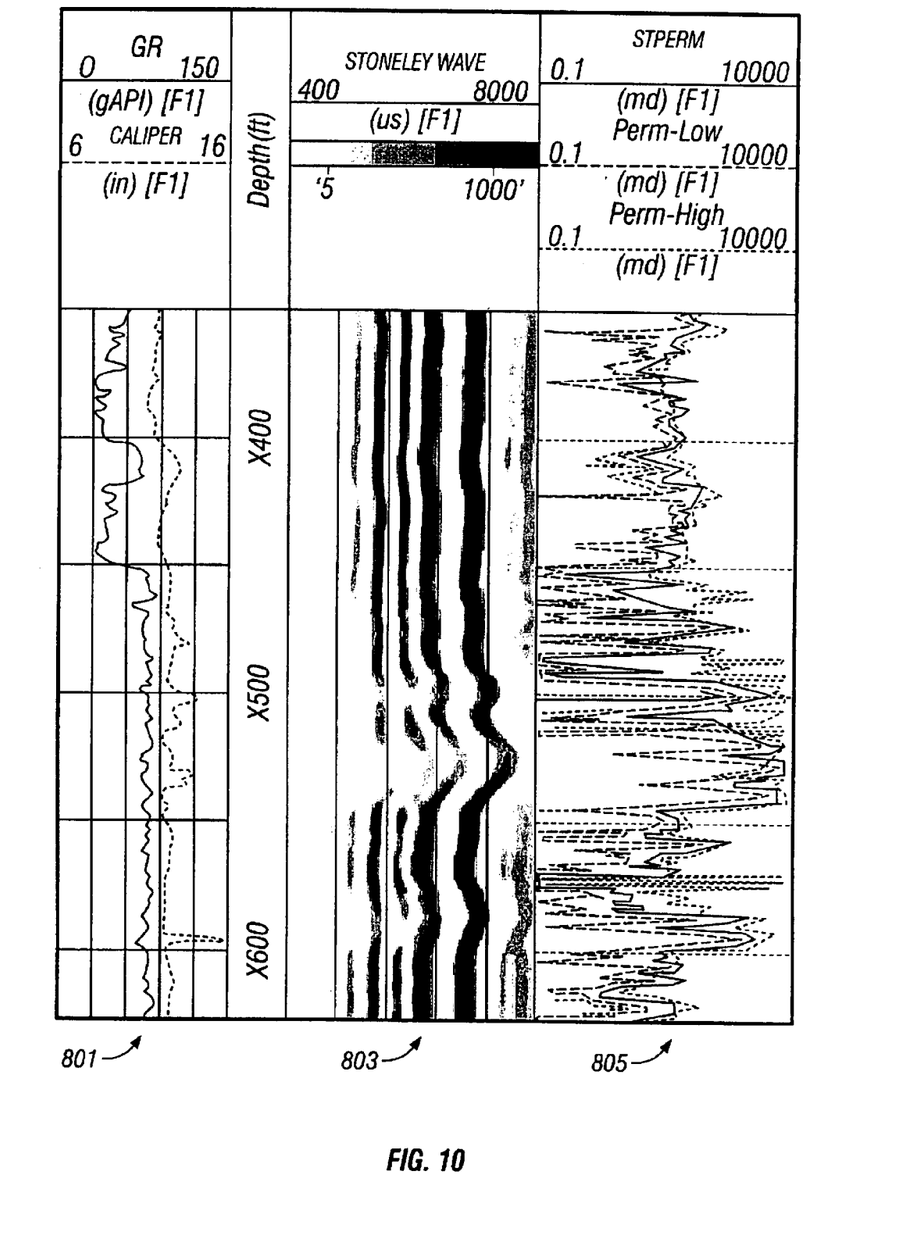
FIG. 10 shows acoustic waveforms of the Stoneley wave arrival in the exemplary well of FIG. 7 over a depth interval along with an interpreted permeability.

The Stoneley wave, being an interface wave borne in borehole fluid, is sensitive to fluid-flow conduits (e.g., fractures) at the borehole and can be used to measure the hydraulic conductivity (i.e., permeability) of the conduits. FIG. 10 shows in track 801 the gamma ray and caliper logs. Shown in track 803 are the waveforms of Stoneley waves recorded in the borehole. Track 805 shows the formation permeability derived from the Stoneley waves using a prior art method discussed in (Tang et al., 1998). The solid line in track 805 is the determined permeability while the dashed and dotted lines are the error bounds on the determined permeability. Note that the permeability at around X525 ft depth is about two orders of magnitude higher than that found in the upper portion of the depth interval containing porous sands. Around the depth of X525 ft, the Stoneley wave is delayed and much attenuated. Such an anomalously high permeability in a shale zone indicates good positive fluid flow conduits such as fractures.

Figure 11:
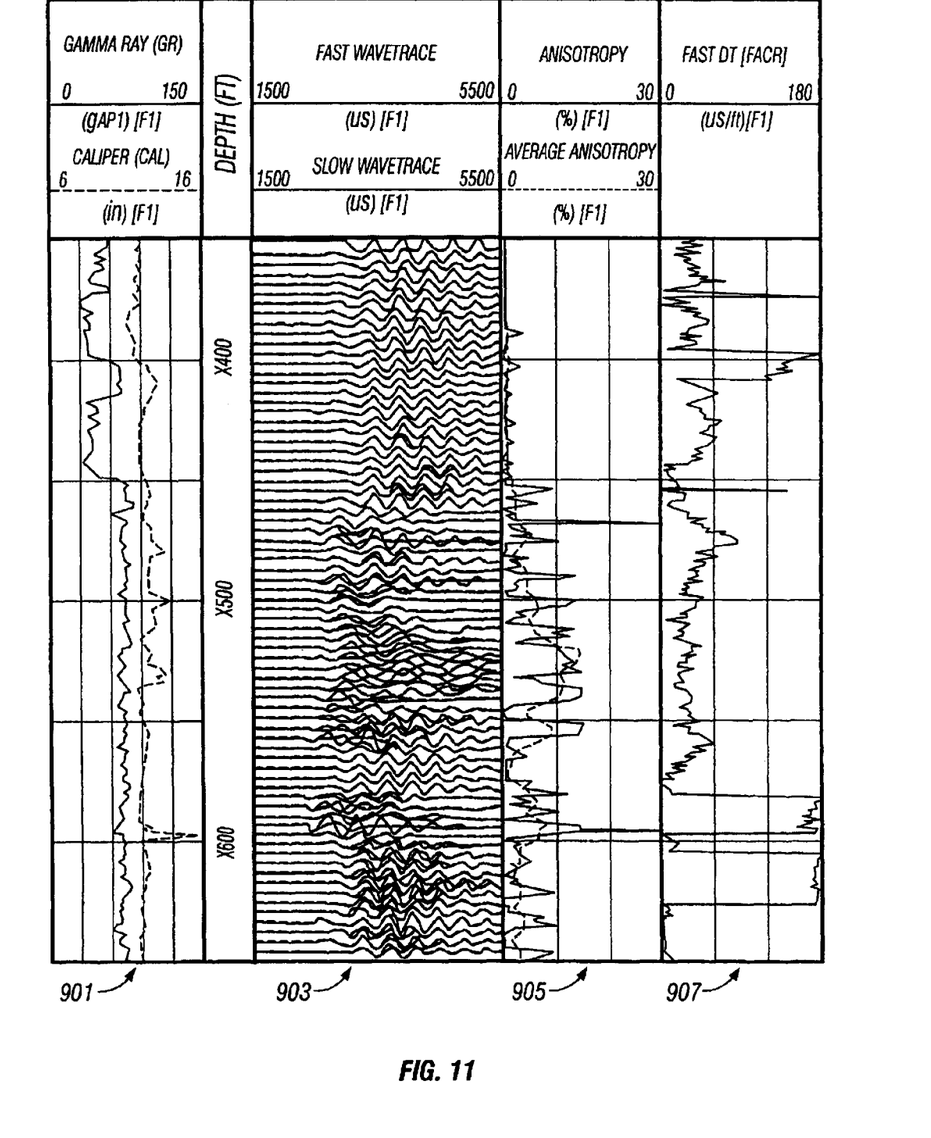
FIG. 11 shows the fast and slow acoustic waveforms obtained with the cross-dipole logging tool along with an interpreted anisotropy and a log of the fast shear wave velocity in the exemplary well.

FIG. 11 shows in track 901 the gamma ray and caliper logs. The cross-dipole acoustic log data in track 903 show significant shear wave splitting below X450 ft with the maximum level of splitting occurring between X500 ft and X550 ft. The azimuthal anisotropy ratio derived from the fast and slow shear waves reaches a maximum value of 14% around the X525 ft depth. The fast shear wave polarization direction (for which the traveltimes are given in the last track of FIG. 11,) defines the strike direction of the fracture. For the data shown, this angle was determined to be 30° to the X-direction of the logging tool using a method such as that given in Becker, the contents of which are fully incorporated herein by reference As noted above, it is important to determine the depth or radial extent of the fracturing. In particular, shallow fractures produced by the drilling process must be identified as such.

Figure 12A:
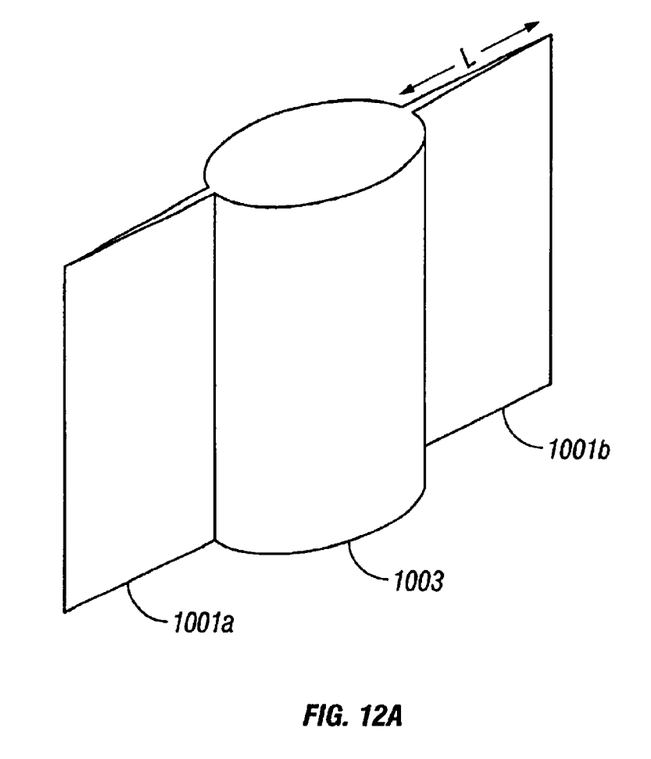
FIG. 12a is a schematic illustration of a wing-like fracture from a borehole
Figure 12B:
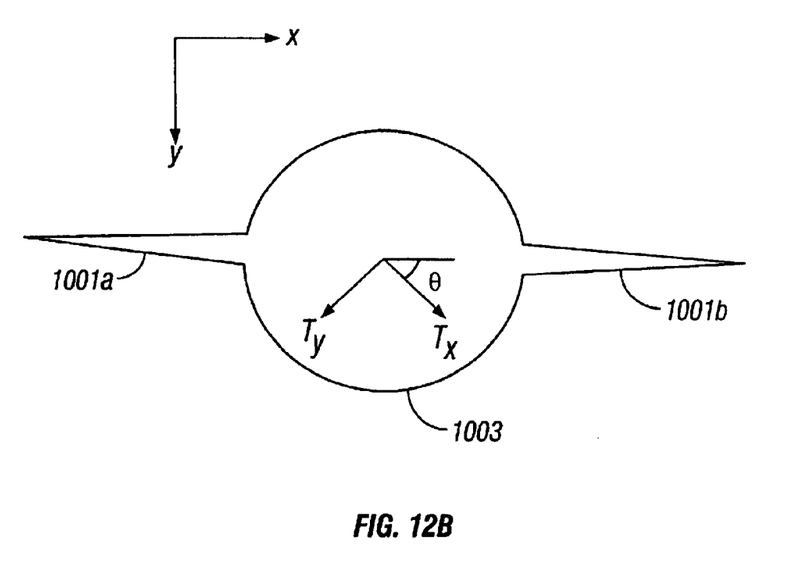
FIG. 12b shows a plan view of the illustration of FIG. 12a along with a formation based coordinate system and a tool-based coordinate system.

FIGS. 12a and 12b show such a fracture with "wings" 1001a and 1001b radiating from a wellbore 1003. FIG. 12a is an isometric view while FIG. 12b is a projection on a plane orthogonal to the borehole axis. Also shown in FIG. 12b are a (x-y) formation based coordinate system defined by the fracture, and a tool having axes $T_x$ and $T_y$ making an angle θ with the (x-y) coordinate system When a fracture such as that shown in FIGS. 12a–12b is filled with a resistive drilling mud, Anderson et al. (1996) and Wang et al. (2001) have shown, that the fracture generally increases the apparent resistivity reading of the coaxial (ZZ) measurement. However, the effects are generally small. For a multicomponent induction device, such a fracture will almost have no effect on the yy configuration but can significantly lower the apparent resistivity reading of xx configuration. A fracture that is filled with conductive mud, however, will have little effect on the zz and xx configurations and may slightly reduce the apparent resistivity reading of the yy configuration.

Using a 3-D modeling algorithm (Wang and Fang, 2001), the sensitivities of the xx, yy, and zz logs to parameters of a fracture filled with oil-based mud were analyzed. An inversion of the resistivity logs shows that the shale zone of interest has quite a uniform resistivity of 1 Ω-m. The mud resistivity is assumed to be 1000 Ω-m. The borehole diameter is 12" (30 cm) and a fracture aperture is taken to be 1" (2.5 cm), For an actual borehole, the diameter would be known from caliper measurements. The fracture aperture may be determined by using a suitable borehole imaging tool, such as a resistivity imaging tool, an acoustic imaging tool, or a density imaging tool. Suitable resistivity imaging tools that is disclosed in U.S. Pat. No. 5,502,686 to Dory et al, or U.S. Pat. No. 6,348,796 to Evans et al, having the same assignee as the present invention and the contents of which are fully incorporated herein by reference. The invention of Dory also includes an acoustic imaging capability. Co-pending U.S. patent application Ser. No. 09/836,980 of Evans et al, having the same assignee as the present application and the contents of which are fully incorporated herein by reference, teaches a resistivity imaging tool suitable for use with non-conducting borehole fluids. A suitable tool for obtaining density images is described in U.S. patent application Ser. No. 10/004,650 of Kurkoski, having the same assignee as the present invention and the contents of which are fully incorporated herein by reference.

Figure 13:
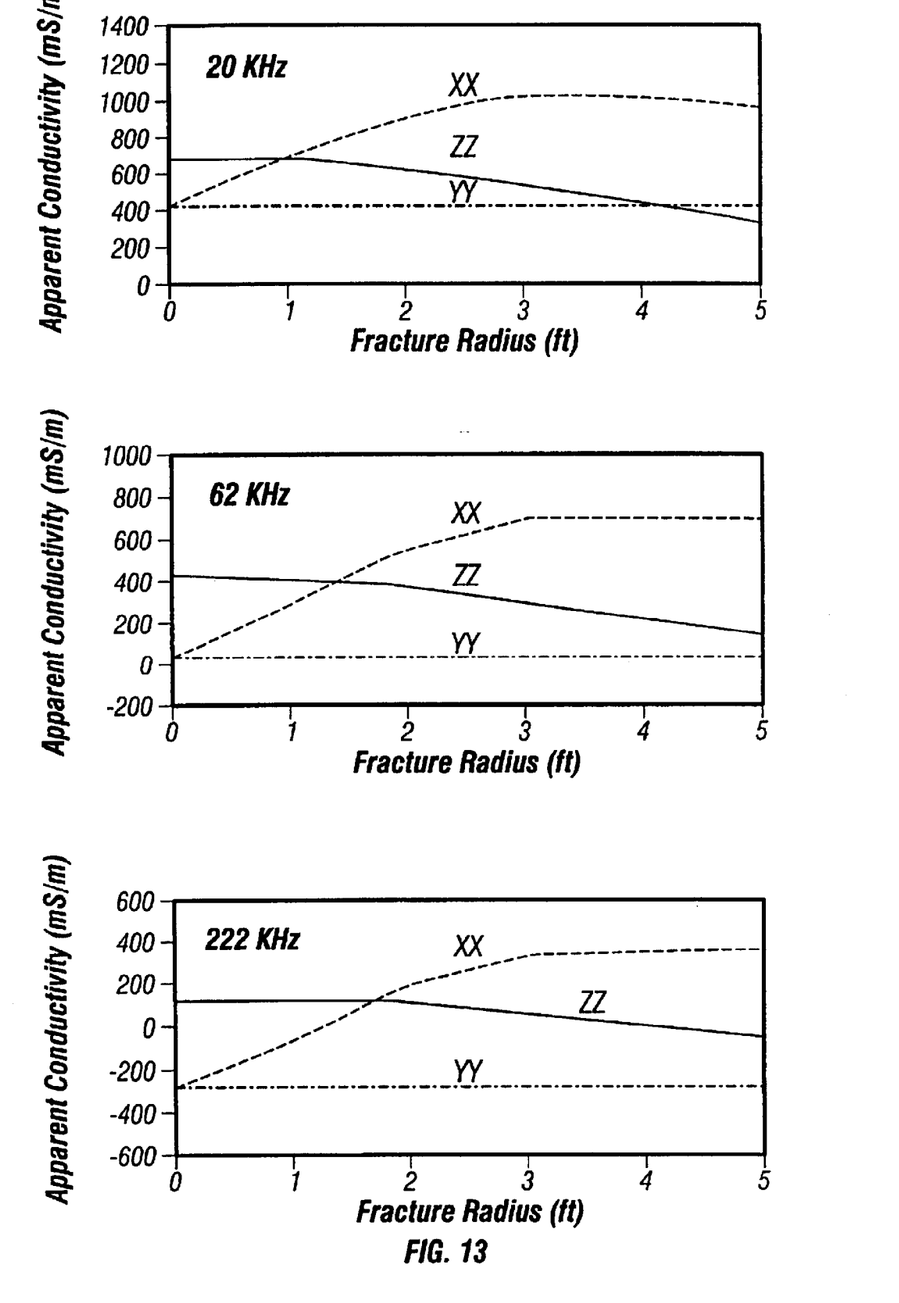
FIG. 13 shows differences displays of xx, yy and zz components of resistivity measurements corresponding to a model of a wing-like fracture

FIG. 13 shows the xx, yy, and zz values for fracture lengths in the range of 0–5 ft. (0–1.5 m) It can be seen that zz, xx, and yy all have different sensitivities to the variation in the fracture length. Curves are shown for frequencies of 20 kHz, 62 kHz and 222 kHz.

Let us first examine the zz response. The zz response is almost insensitive to a fracture less than 2 ft in length. Beyond that point, the zz response decreases as the fracture length increases. The magnitude of the variation is about 200 mS/m for fractures up to 5 ft long.

Next, we examine the xx and yy responses. The yy response is completely insensitive to the fracture length. This result is expected because the induced current in the formation flows parallel to the fracture plane and the fracture becomes transparent to the induction current. The most interesting observation concerns the xx response. In contrast to the zz response, the xx response increases almost linearly with the fracture length for the first 2 ft. Beyond that, the xx response reaches an asymptotic value. For all frequencies investigated, the xx response changed by about 700 mS/m, a value much greater than was the case for the zz response.

The length of a drilling-induced fracture is a factor of the mud pressure, the rock strength, and the strength of the in-situ formation stress. For a given mud weight and rock type, the stronger the in-situ formation stress, the longer the induced fracture will be. Therefore, the drilling-induced fracture length yields information of about the formation stress strength. The fracture lengths may be estimated from the multicomponent induction logs because of their relatively large depths of investigation. In reality, the tool may be arbitrarily rotated in the borehole. Assume the x-transmitter is at an angle θ to the x-axis as shown in FIG. 12b. Then the XX and YY responses can be calculated from those shown in FIG. 13 as $$H_{XX} = H_{xx} \cos\theta + H_{yy} \sin\theta$$

$$H_{YY} = H_{xx} \sin\theta - H_{yy} \sin\theta$$

where $H_{xx}$ and $H_{yy}$ are the tool responses for θ=0 given in FIG. 12.

Figure 14:
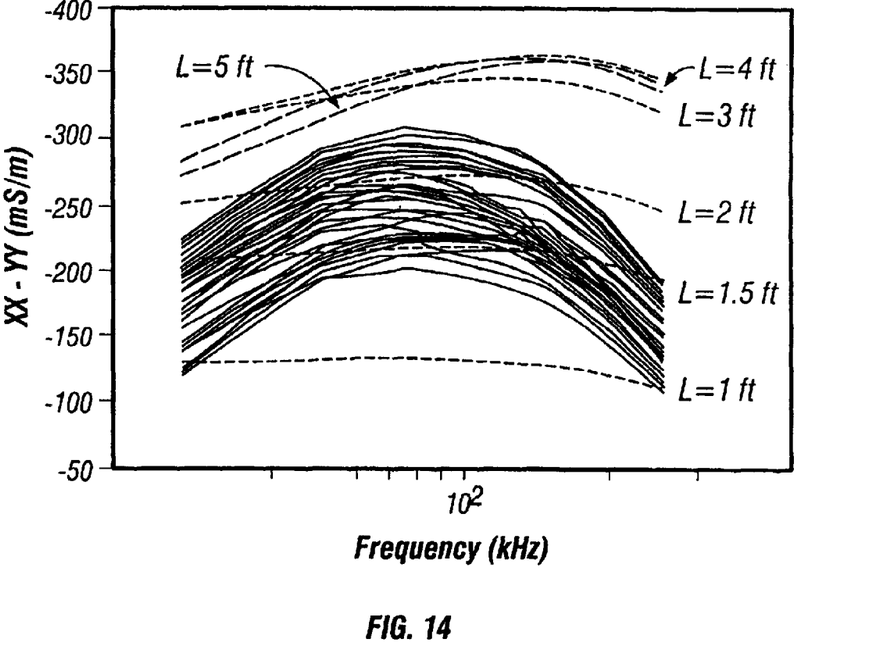
FIG. 14 shows a comparison between model outputs for different fracture lengths compared to measurements made in the exemplary well.

As an example, the fracture length in the interval of X510–560 ft (where the XX and YY logs have the largest difference) are estimated. The angle θ is obtained from the XMAC data (FIG. 11) and is estimated to be about 30°. FIG. 14 shows the ($H_{XX}$–$H_{YY}$) values superimposed on the numerically simulated data. The real logs are selected from depths between X535 and X550 ft, which correspond to the maximum differences between the XX and YY logs. Given the uncertainties in the numerical model used, we can conclude that the fracture length is of the order of 1.5–2 ft. This estimation is consistent with the observation that no massive lost circulation was observed prior to logging. As a consequence, any fracture is not expected to reach far into the formation. Those versed in the art would recognize that in order to identify the fracture parameters, two independent measurements are needed. The XX and YY measurements are the most convenient, but the method described above could also be used with either the XX and YY measurements in combination with the XY measurement. As noted above, the ZZ measurement is relatively insensitive to fractures.

Figure 15:
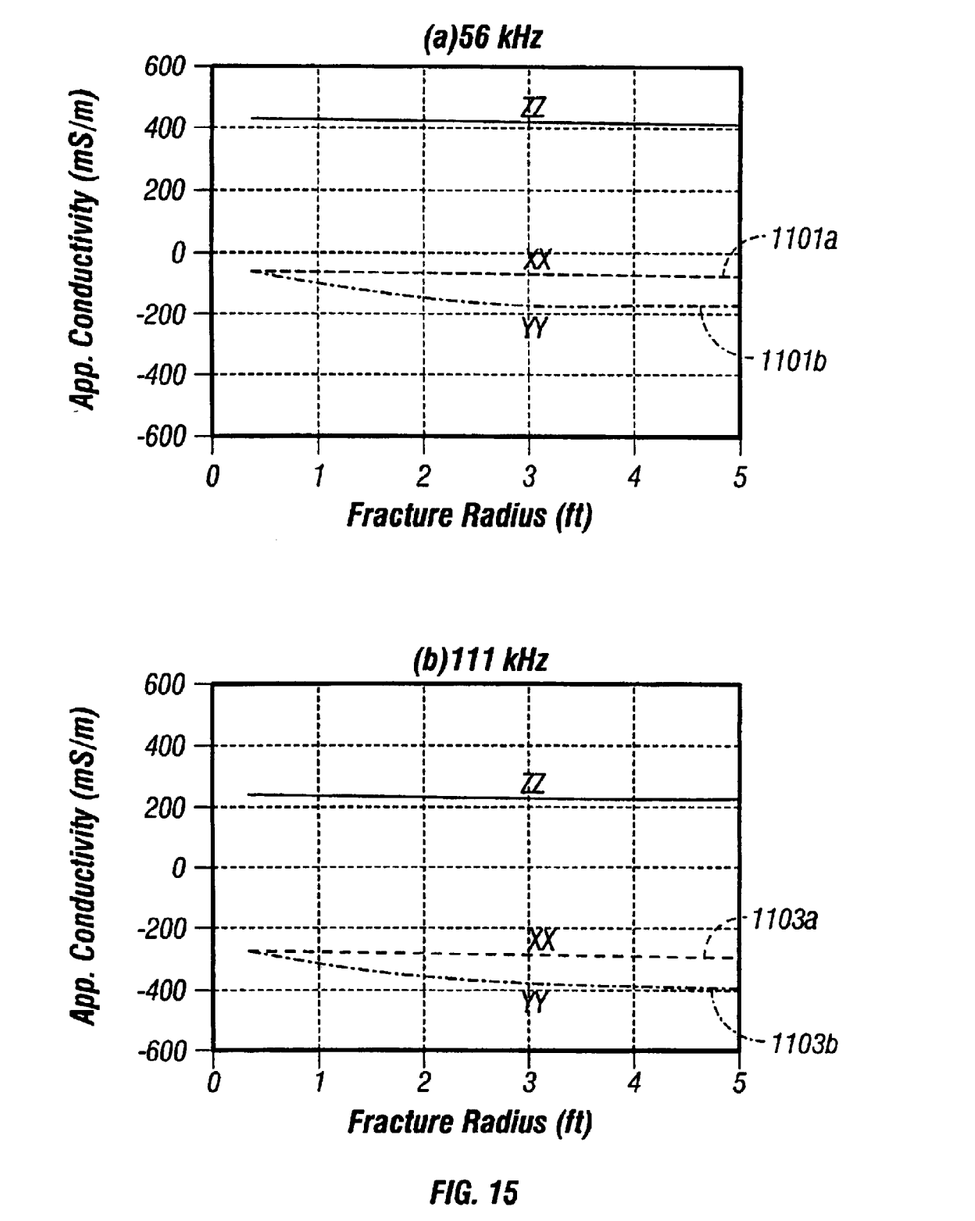
FIG. 15 shows displays of xx, yy and zz components for a wing-like fracture filled with a conductive fluid.

The modeling and interpretation example given above is for a resistive mud in the borehole. The methodology described above may also be used with a conducting mud in the borehole. FIG. 15 shows an illustrative example at frequencies of 56 kHz and 1111 kHz. The mud resistivity was taken to be 0.1 Ω-m. Comparison of FIG. 15 with FIG. 13 shows several important features. First, regardless of the frequency, the zz and the xx (1101a, 1103a) responses are quite insensitive to the fracture depth (or radius) for the low resistivity mud; however, the yy component (1101b, 1103b) does exhibit a variation with the fracture depth. Secondly, differences between the xx and the yy measurements are much smaller with a conductive mud than with a resistive mud. However, a difference of 50 mS/m as seen in FIG. 15 would be detectable.

A suitable device for obtaining mud resistivity is disclosed in U.S. patent application Ser. No. 10/142,307 of Fabris et al, having the same assignee as the present application and the contents of which are fully incorporated herein by reference.

Reference has been made above to the use of an imaging tool for determination of a fracture thickness. The imaging tool may also be used to determine the fracture azimuth. Ideally, the fracture azimuth determined by the imaging tool would be the same as the fracture azimuth determined from the cross-dipole acoustic measurements. In this respect, the imaging tool may be used as a consistency check on the azimuth determination made by the cross-dipole acoustic logging tool. However, there may be a difference between the two determinations due to the fact that the imager is producing a picture of the borehole wall, whereas the cross-dipole logging tool is seeing some distance (of the order of 1 m) into the formation. In an alternate embodiment of the invention, the fracture azimuth may be obtained solely from the imager tool and the cross-dipole data are not used.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining a parameter of interest of a subsurface formation, said subsurface formation including fractures having a fluid therein, the method comprising:
   (a) using a cross-dipole acoustic logging tool in a borehole within the formation and making a set of acoustic measurements indicative of the parameter of interest;
   (b) processing the acoustic measurements and obtaining an estimate of a principal direction of anisotropy of the subsurface formation relative to an axis of the borehole;
   (c) using an electrical logging tool in the borehole for obtaining resistivity measurements indicative of the parameter of interest;
   (d) defining a model including the principal direction of anisotropy; and
   (e) determining from the resistivity measurements the parameter of interest, said determination based at least in part on said model.

2. The method of claim 1 wherein using said dipole logging tool further comprises generating two dipole shear waves with different polarization.

3. The method of claim 2 wherein obtaining an estimate of said principal direction of anisotropy further comprises determining a velocity or travel time difference between said two dipole shear waves.

4. The method of claim 1 wherein said electrical logging tool comprises a multicomponent induction logging tool, and said resistivity measurements comprise at least two measurements selected from the group consisting of (i) a $H_{xx}$ measurement, (ii) a $H_{yy}$ measurement, and (iii) a $H_{xy}$ measurement.

5. The method of claim 1 wherein said model further comprises:
   (i) a resistivity of the formation when there are no fractures therein;
   (ii) a resistivity of the fluid in the fractures and
   iii) an angle between axes of said electrical logging tool and a principal direction of anisotropy determined from said acoustic measurements.

6. The method of claim 1 wherein determining the parameter of interest further comprises matching a synthetic model response with said resistivity measurements.

7. The method of claim 5 wherein determining the parameter of interest further comprises matching a synthetic model response with said resistivity measurements.

8. The method of claim 7 wherein said synthetic model is derived at at least one frequency.

9. The method of claim 8 wherein said at least one frequency further comprises a plurality of frequencies.

10. The method of claim 5 wherein said model further comprises a thickness of a fracture.

11. The method of claim 1 wherein said parameter of interest comprises a radial extent of a fracture in said formation.

12. The method of claim 10 further comprising using an imaging tool for determining said thickness of said fracture.

13. The method of claim 12 wherein said imaging tool is selected from the group consisting of (I) a resistivity imaging tool, (II) an acoustic imaging tool, and, (III) a density imaging tool.

14. The method of claim 5 further comprising using a mud-resistivity measuring device for obtaining said resistivity of said fluid in the fractures.

* * * * *